Patented Apr. 24, 1928.

1,667,237

UNITED STATES PATENT OFFICE.

ARTHUR BINZ, OF BERLIN, AND CURT RÄTH, OF RANGSDORF, GERMANY.

PROCESS FOR THE PREPARATION OF ORGANIC ARSENIC COMPOUNDS.

No Drawing. Application filed July 13, 1926, Serial No. 122,265, and in Germany July 22, 1925.

The object of this invention is the preparation of compounds containing two arsenic molecules, connected by a double bond, of the general formula R—As=As—$R_1$ wherein R and $R_1$ may be similar or dissimilar, substituted or unsubstituted, aliphatic, isocyclic or heterocyclic organic radicals. This class of arsenic compound can be prepared by the condensation of arsines of the general formula R—$AsH_2$ with arsine compounds of the general formula $R_1$—AsX where X may be either an oxygen or two halogen radicals such as for instance chlorine, so that $R_1$As—X may mean for example $R_1$As=O or $R_1$As=$Cl_2$ or the like. Usually the yield of the condensation products is very low, but we have discovered that the yield can be increased nearly to the theoretical amount if substances are employed which are capable of promoting the condensation. We have found that reducing agents of mild action such as hypophosphoric acid or alkali metal hypophosphites will serve as such a substance and that small quantities of the same are sufficient for obtaining the desired result.

Examples.

(1) 12 grams of 3-nitro-4-hydroxy phenyl arsonic acid in a water solution were reduced to the corresponding arsine by means of zinc and hydrochloric acid. After completion of this reaction the zinc sludge was filtered off and the solution stirred into an aqueous solution containing 10 grams of 2-hydroxy-5-dichlorarsine pyridine hydrochloride, 3 grams of sodium hypophosphite were added as a condensing agent. A yellow precipitate is formed, which was filtered and then washed with hydrochloric acid solution followed with alcohol and ether. The yield was nearly quantitative and the product was of high purity. The reactions are as follows:

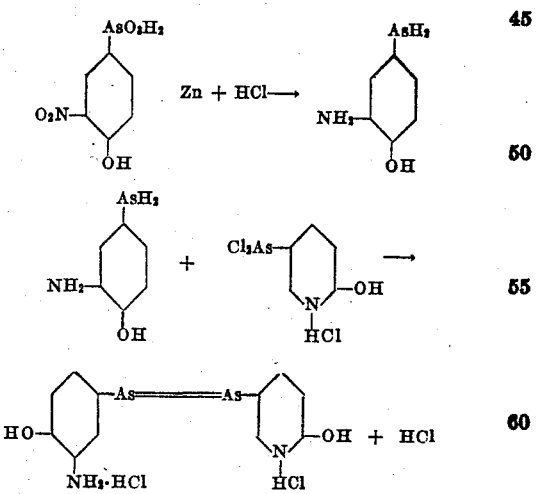

It is clear from the small amount of reducing material required that the reaction is not dependent on a reduction but that the large increase in yield is due to the condensation being favorably influenced by the reducing agent.

(2) 21.7 grams arsanilic acid were dissolved in 300 cc. water and 150 cc. hydrochloric acid and then reduced with 70 grams zinc dust. When the reduction is finished the solution of the arsine is filtered and added to a solution which has been prepared by reducing 23.3 grams 3-amino-4-hydroxyphenyl arsonic acid in 200 cc. water and 35 cc. hydrochloric acid by means of sulphurous acid. 15 grams sodium hypophosphite are then added. The mixture after being agitated for 1 hour is filtered off and the residue washed with water. Yield about 90%.

The reaction is:

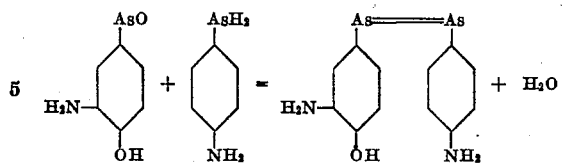

(3) 24.6 grams ortho-benzoïc arsonic acid were dissolved in 400 cc. water and 70 cc. hydrochloric acid. Sulphur dioxide is passed into the solution for 6 hours after 6 grams potassium iodide have been added. After completion of the reduction carbonic dioxide is introduced into the solution until the sulphur dioxide has disappeared. To the solution is then added a solution of 2-hydroxy-pyridine-5-arsine which has been prepared by reducing 21.9 grams 2-hydroxy-pyridine-5-arsonic acid, in 300 cc. water and 150 cc. hydrochloric acid by means of 70 grams zinc dust. 15 grams sodium hypophosphite are added and the whole agitated for another hour. The precipitate is filtered off. Yield about 90%.

The reaction is:

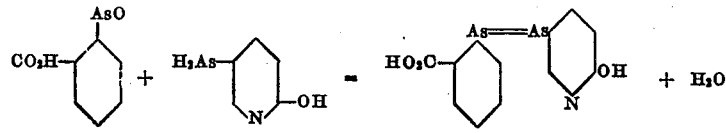

What we claim is:

1. Process for the preparation of organic arsenic compounds containing the group $-As=As-$ which comprises condensing an arsine of the formula $R-AsH_2$ with an arsine compound of the general formula $R_1-AsX$ wherein X represents oxygen or two halogens in the presence of a reducing agent, which is capable of reducing arsonic acids to arseno compounds, R and $R_1$ being similar or dissimilar aliphatic, isocyclic or heterocyclic radicals.

2. Process for the preparation of organic arsenic compounds containing the group $-As=As-$ which comprises condensing an arsine of the formula $R-AsH_2$ with an arsine compound of the general formula $R_1-AsX$ wherein X represents oxygen or two halogens in the presence of hypophosphoric acid, R and $R_1$ being similar or dissimilar aliphatic, isocyclic or heterocyclic.

3. Process for the preparation of organic arsenic compounds containing the group $-As=As-$ which comprises condensing an arsine of the formula $R-AsH_2$ with an arsine compound of the general formula $R_1-AsX$ wherein X represents oxygen or two halogens in the presence of an alkali metal salt of hypophosphoric acid, R and $R_1$ being similar or dissimilar aliphatic, isocyclic or heterocyclic radicals.

Signed at Berlin, in the county of Brandenberg and State of Prussia, this 22d day of June, A. D. 1926.

ARTHUR BINZ.
CURT RÄTH.